United States Patent [19]
Ahmed

[11] Patent Number: 5,780,780
[45] Date of Patent: Jul. 14, 1998

[54] WEIGHING VIBRATORY APPARATUS AND METHOD

[76] Inventor: Gulzar Ahmed, 9775 SW. Pawnee Path, Tualtin, Oreg. 97062

[21] Appl. No.: 782,441

[22] Filed: Jan. 17, 1997

[51] Int. Cl.⁶ .................. G01G 13/02; G01G 23/10; G01G 21/10
[52] U.S. Cl. .................. 177/119; 177/185; 177/189
[58] Field of Search .................. 177/119, 184–189

[56] References Cited

U.S. PATENT DOCUMENTS

| | | | |
|---|---|---|---|
| Re. 32,102 | 4/1986 | Ricciardi et al. | 177/185 |
| 3,643,753 | 2/1972 | Godwin et al. | 177/185 |
| 4,513,830 | 4/1985 | Persbeck et al. | 177/16 |
| 4,580,698 | 4/1986 | Ladt et al. | 177/16 |
| 4,682,664 | 7/1987 | Kemp | 177/16 |
| 4,708,215 | 11/1987 | Nakamura et al. | 177/25 |
| 4,730,499 | 3/1988 | Gianella et al. | 177/185 |
| 4,809,795 | 3/1989 | Neumann | 177/59 |
| 5,002,140 | 3/1991 | Neumiller | 177/16 |
| 5,338,901 | 8/1994 | Dietrich | 177/16 |
| 5,639,995 | 6/1997 | Mosher | 177/119 |

*Primary Examiner*—Michael L. Gellner
*Assistant Examiner*—Anh Mai
*Attorney, Agent, or Firm*—William A. Birdwell & Associates

[57] ABSTRACT

A weighing vibratory apparatus and method. In one embodiment, an infeed vibratory conveyor element feeds a bulk product to a weighing vibratory conveyor element. In another embodiment, bulk product is fed directly to a weighing vibratory conveyor element and flow rate is determined by measuring the loss of weight therefrom. The weighing vibratory conveyor element includes a weight measuring apparatus that weighs the product at the same time that the product is being dispensed through vibrations. The weight measuring apparatus may be coupled to the vibratory conveyor element through damping mechanisms. An electrical signal output of the weight measuring apparatus may be low-pass filtered to provide an improved signal for feeding to a controller for controlling the flow rate.

17 Claims, 3 Drawing Sheets

5,780,780

WEIGHING VIBRATORY APPARATUS AND METHOD

BACKGROUND OF THE INVENTION

This invention relates to a weighing vibratory apparatus and method adapted for weighing one or more objects on the apparatus while the apparatus is vibrating.

It is often desirable to provide for a controlled flow rate of a stream of bulk product, particularly in applications where it is desired to dispense selected quantities or proportions by weight of the bulk product. Variable speed conveyors have been used for this purpose, flow rate control being obtained by measuring the weight of objects as they are being transported on a conveyor of known length.

However, typical conveyors employ endless belts with which objects which it is desired to move generally must come into contact. It is often difficult to maintain the cleanliness of such endless belts. This is a particular and, often, serious disadvantage when transporting, for example, foodstuffs being unpackaged, peeled, cut or otherwise processed to expose edible surfaces (hereinafter "raw foodstuffs"). It is also particularly important when dispensing measured quantities of objects, for example, to obtain desired proportions by weight of one type of foodstuff to another, that the objects be in their final, cleansed state, for weighing. Therefore, it is generally undesirable to move objects such as raw foodstuffs on a typical belt type conveyor.

Neumuller, U.S. Pat. No. 5,002,140 ("Neumuller"), proposes a method of and apparatus for weighing a continuous stream of fluent material. Material is fed through a weigh chute by gravity, the material falling onto a material speed measuring means. A load measuring means attached to the weigh chute determines the mass of material flowing in the chute. The measured mass and speed are employed to determine a mass flow rate.

Neumuller may provide for desirable sanitariness. However, Neumuller does not propose a means of flow rate control; i.e., the gravity chute of Neumuller does not permit adjustment of flow rate. Moreover, if adjustable, the gravity chute of Neumuller would provide for limited control of flow rate.

An apparatus providing for adjustable flow rate that is well adapted for sanitizing is the vibratory conveyor. In such a device, there is no conveyor in the usual sense. Rather, a pan or chute is imparted oscillatory motions of small amplitude so that the apparatus stays substantially in one place as objects lying thereon are urged to move unidirectionally, typically for dispensation. Since it is not required to provide for recirculation as is typically required for a conveyor, the pan or chute of the vibratory conveyor may be monolithically, smoothly and rigidly formed and therefore may be especially adapted to be easily cleaned and to maintain cleanliness. The pan or chute may also be especially adapted for easy removability from the apparatus for such cleaning.

The advantages of employing a vibratory dispenser for controlling flow rate of a bulk product have not, however, heretofore been realized. It has remained a serious problem that the oscillatory motions of the dispenser deleteriously affect weighing apparatus. This is true both in the ability of the weighing apparatus to accurately measure the weight of objects being vibrated and in the ability of the weighing apparatus to maintain reliability and longevity during such use.

Accordingly, there is a need for a novel and improved weighing vibratory method and apparatus.

SUMMARY OF THE INVENTION

The weighing vibratory apparatus and method of the present invention solves the aforementioned problems and meets the aforementioned need by employing, in one embodiment, an infeed vibratory conveyor element feeding a bulk product to a weighing vibratory conveyor element. The vibratory conveyors are driven to have periodic, oscillatory movements by means of a source of mechanical oscillations, such as provided by coupling the flux of a changing magnetic field to the conveyors. The drive frequency and the natural resonance frequency of the apparatus are tuned to substantially match. The weighing vibratory conveyor includes a weight measuring apparatus for measuring the weight of the product stream on or in the conveyor as the conveyor is operating. The weight measuring apparatus includes one or more damping mechanisms for damping mechanical vibrations of the vibratory conveyor element. An electrical signal output from the weight measuring apparatus that is indicative of a measured weight of the product on the vibratory conveyor element. The electrical signal is preferably filtered of frequency components associated with the vibration. The measured weight is employed to adjust the speed of the infeed vibratory conveyor, preferably by varying the drive amplitude, to dispense the bulk product at a desired, set-point flow rate.

Alternatively, the infeed vibratory conveyor element and the weighing vibratory conveyor element may be combined into a single conveyor element, so that the bulk product is weighed while being conveyed along a single conveyor. A measured amount of the bulk product may be supplied to the single conveyor element and the flow rate may be determined by measuring the loss of weight of product as it is conveyed off, or dispensed from, the single conveyor. The flow rate may be adjusted by adjusting the speed of the single conveyor.

Therefore, it is a principal object of the present invention to provide a novel and improved weighing vibratory apparatus and method.

It is a further object of the present invention to provide such an apparatus and method that provides for improved capability to receive sanitization and maintain sanitariness.

The foregoing and other objects, features, and advantages of the invention will be more readily understood upon consideration of the following detailed description of the invention, taken in conjunction with the accompanying drawings.

DETAILED DESCRIPTION OF A PREFERRED EMBODIMENT

Figure 1A:
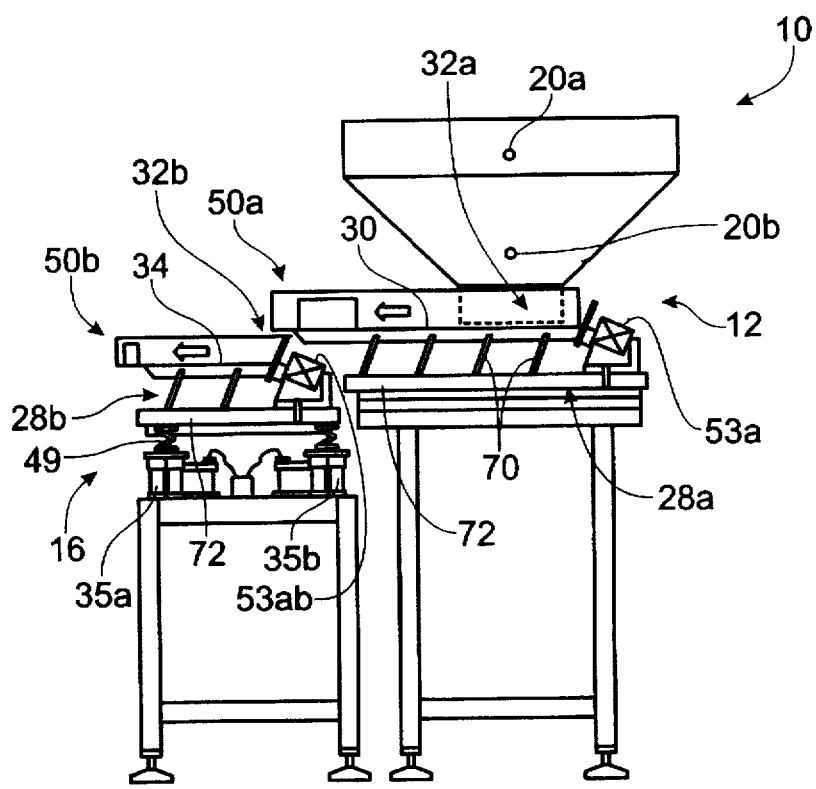
FIG. 1A is a side elevation of a first embodiment of a weighing vibratory apparatus according to the present invention.
Figure 1B:
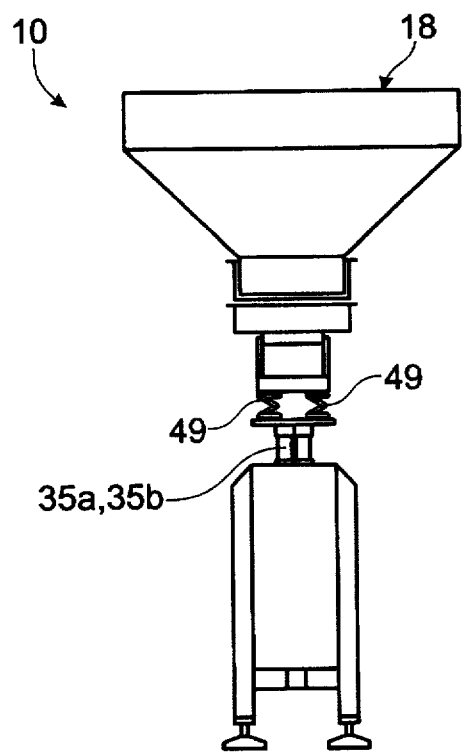
FIG. 1B is an end view of the apparatus of FIG. 1A.

Referring to FIGS. 1A and 1B, a preferred embodiment of a weighing vibratory apparatus 10 according to the present invention comprises an infeed vibratory conveyor 12 feeding a solid (hereinafter "bulk") product 14 (not shown) to a weighing vibratory conveyor 16. While a flow rate is generally desired for a stream of objects, the invention may also be employed for use with only one or only a few objects without departing from the principles therefrom.

The conveyors 12 and 16 may be employed to convey the bulk product 14 from one location to another. However, the primary purpose of the conveyors for purposes of the invention is to establish a desired flow rate of the bulk product, for dispensation thereof in measured quantities.

The bulk product 14 may comprise any solid object such as foodstuffs, electrical and mechanical hardware, electrical and mechanical assemblies, and packaged goods. However, the apparatus 10 is particularly advantageous for dispensing raw foodstuffs. Moreover, one or more of the apparatus 10 may be employed, for example, for controlling the proportion of ingredients in a blend or mixture, such as seasoning on potato chips, additives in cereals, and mixed vegetables. The bulk product 14 is stored temporarily in a hopper 18 for feeding onto the infeed conveyor 12.

Referring to FIGS. 1A, 1B and 6, the hopper 18 includes a manually operated slide gate 24 (not shown) for adjusting the depth of the bulk product 14 on the infeed conveyor 12. The slide gate 24 provides a variable sized aperture 26 through which the bulk product is fed, preferably by force of gravity, onto the conveyor 12. Adjustment of the slide gate 24 in the present invention provides for a substantially fixed depth of bulk product 14 on the conveyor 12.

The hopper 18 also includes a high level sensor 20a and a low level sensor 20b of the level of bulk product 14. The high and low level sensors output respective high and low level sense signals 22a, 22b. The high level sense signal 22a is "true" when product is detected at the level of the sensor 20a. The low level sense signal 22b is "true" when product is no longer detected at the level of the sensor 20b. The sensors 20a and 20b may be, for example, photodetectors.

The hopper is fed by an infeed means 17. The infeed means could be a human operator, but is preferably an automatic means for filling the hopper according to the high and low level sense signals 22a, 22b. The high and low level sense signals 22a, 22b are input to a controller 40 (described below) which outputs an infeed control signal 25 to the automatic infeed means in response thereto. In particular, the infeed means is switched off when the high level sense signal 22a is true and the infeed means is switched on when the low level sense signal 22b is true. Where the infeed means is a human operator, the controller 40 may provide the function of signaling the operator to feed the hopper 18 at intervals that assist to maintain product level in the hopper at the selected flow rate.

The conveyor elements 12, 16 employ respective vibratory conveyors 30, 34 which are adapted to convey the bulk product from respective entry ends 32a, 32b to respective exit ends 50a, 50b where the bulk product is dispensed. The conveyors 30, 34 are driven to have oscillatory, periodic movements so as to convey the objects. The periodic movements may be imparted by any number of methods—electrical, mechanical or electromechanical—known to those of ordinary skill in the mechanical arts. However, the periodic means are preferably obtained by applying a changing magnetic flux across a ferrous metal or other magnetically permeable material bridge 51 attached to the conveyors 30, 34 or, alternatively, forming part or all of the conveyors 30, 34.

Respective variable magnetic field drive units 53a, 53b are employed to provide the changing magnetic flux wherein the time rate of change of the magnetic flux is substantially synchronous with and proportional to desired periodic movements of the conveyors. A preferred embodiment of the drive units 53a, 53b for use with the present invention is marketed by Crescent Systems, Inc. of Tualatin Oreg. under the trademark EMTECH. The drive units 53a, 53b have a stroke that is variable with power supplied thereto.

The conveyor 30 receives the bulk product 14 from the hopper 18, and the conveyor 34 receives the bulk product from conveyor 30. Both the conveyors 30, 34 come into physical contact with the bulk product. Therefore, it is preferable that the conveyors 30, 34 are especially adapted for ease and maintenance of sanitation. The conveyors 30, 34 are preferably formed so as to have smooth surfaces for cleaning and are preferably formed of a material, such as aluminum or stainless steel, that will not chemically react with the bulk product or cleaning agents. Alternatively, the conveyors 30, 34 may be plated or coated with one or more such materials as are known to those ordinary skill which are particularly adapted for being maintained in a sanitary condition, such as Teflon. The conveyors 30, 34 may be adapted for easy removal and replacement onto the respective infeed vibratory conveyor 12 and weighing vibratory conveyor 16. However, due to the vibrations of the conveyors 30, 34, it is preferable to bolt the conveyors rigidly to the respective infeed vibratory conveyor and the weighing vibratory conveyor.

Movement of the bulk product 14 along the conveyors 30, 34 may be with the assistance of gravity, obtained by slightly angling the conveyors with respect to the horizontal. However, to provide for optimum flow control it is advantageous to employ substantially horizontal vibratory conveyors 30, 34. Particularized oscillatory movements are then imparted to the conveyors to move the product thereon in a preferred direction.

Figure 3:
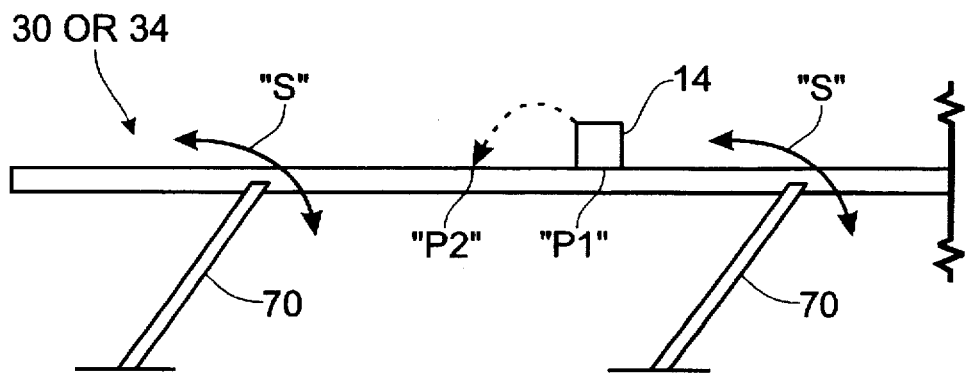
FIG. 3 is a schematic of an object being moved along a conveyor according to the present invention.

Referring to FIG. 3, leaf springs 70 associated with the conveyors 30, 34 connect the conveyors to respective pedestals 72. The leaf springs permit, by bending, movement of the conveyors in a small arc "s" defined by the length of the springs 70. For feeding the bulk product 14 in a forward direction, the springs are angled with respect off the vertical so that forward motion of the conveyor causes the conveyor to rise upwardly and forwardly along the arc while reverse motion of the conveyor causes the conveyor to fall backwardly and downardly along the arc. As the conveyor 30 or 34 rises upwardly and forwardly, it launches bulk product located at a location "P1" thereon upwardly and forwardly off of the conveyor. As the conveyor is brought backwardly and downwardly, the product is allowed to fall at a location "P2" on the conveyor that is in the forward direction with respect to the location "P1". Repeated cycles move the product in steps along the conveyor.

The leaf springs 70 are, preferably, formed of fiberglass; however, steel or other spring-material may be employed as well. It can be seen that the mass sprung with the leaf springs generally includes the mass of the conveyor and pedestal 72 as well as the mass of the product 14 therein or thereon at the operating product flow rate. The values of the springs 70, i.e., their spring constants, together with the sprung mass, provides for a natural resonance frequency of the associated conveyor 30 or 34. The natural resonance frequency is preferably made to match the frequency of the associated drive unit 53a, 53b, by varying any or all of the spring values, the sprung mass, and the drive frequency, as well as other masses, compliances and dampings in the apparatus 10 (together, hereinafter "system parameters"). This allows for a minimum power consumption in the apparatus 10.

The conveyor 34 is coupled to a weight measuring apparatus 36. The weight measuring apparatus preferably comprises two, spaced-apart load cells 35a, 35b; however, any number of load cells or other force measuring apparatus may be used, including one load cell or other force measuring apparatus, without departing from the principles of the invention.

The load cells 35a, 35b provide force measuring outputs 36a, 36b which are connected to a summing circuit 38 in the controller 40 for creating a weight sum signal 39. The load cells preferably have a sufficiently high frequency response to respond to anticipated changes in product weight or rate of flow. However, the load cells are also preferably damped sufficiently to minimize their response to the frequencies of vibration of the the conveyor 34. A preferred load cell is the TEDEA Model 1010, marketed by Tedea Huntleigh International Ltd. of Herzuya, Israel under the trademark TEDEA TH HUNTLEIGH. This load cell has a 5 kg capacity and has a typical settling time of 100 to 150 milliseconds. The preferred load cells 35a, 35b are provided with a silicone or other viscous fluid coupling that effects a desirable mechanical damping. The preferred load cells also incorporate adjustable springs to tare out the weight of the conveyor 34 so that the outputs 36a, 36b represent substantially the weight of the bulk product 14.

The pedestal 72 is preferably coupled to the weight measuring apparatus 36 through compression springs 49, to provide additional mechanical isolation of the load cells 35a, 35b from the periodic movements of the conveyor 34. The values of the compression springs 49 preferably provide for about a ten-fold attenuation of the amplitude of vibration of the conveyor 34 at the drive frequency of the drive units 53a, 53b. However, the amount of isolation desired of the compression springs is a determination that must generally be made in consideration of all of the system parameters and is generally a matter of trial and error owing to the dynamic complexity of the apparatus 10.

The weight sum signal 39 is an indication of flow rate of the product 14. That is, the rate of flow of the product 14 is proportional to the weight of the product 14 as indicated by the weight sum signal, multiplied by the speed of the conveyor and divided by the length of the conveyor. Preferably, in addition to the aforementioned mechanical damping, the controller 40 employs a filter 55 for filtering the high frequency components of the weight sum signal 39, wherein high frequency components are defined to be at a frequency that is about ten times faster than the rate of change of product weight encountered during operation of the apparatus 10. Of course, a filter 55 having a sharper frequency cut-off may be employed if necessary, to pass frequencies in the weight sum signal that are closer to the vibration frequencies.

To obtain a desired set-point value of flow rate, the controller 40 adjusts the speed of travel of product on the conveyor 30 ("speed of the conveyor") of the infeed conveyor 12. An infeed infeed vibratory drive signal 64 is output from the controller as input to a drive amplifier 66. The drive amplifier 66 supplies sinusoidal, variable ac power 67 to the drive unit 53a at the frequency set by the controller through the signal 64, the variable power varying the magnitude of the stroke of the drive unit to provide a variable speed of the conveyor 30 as well as a substantially constant depth of the product 14 thereon. However, the speed of the conveyor 30 may be varied by varying the frequency of the power to the drive unit 53a without departing from the principles of the invention.

The drive unit 53b preferably drives the weighing vibratory conveyor 12 at a constant speed and, therefore, provides for a variable depth of the product 14 thereon. The controller 40 may include a feed-back circuit (not shown) for maintaining a constant power to the drive unit 53b, thereby controlling the stroke thereof and consequently the speed of the conveyor 30.

The controller 40 also, preferably, outputs a display signal 45 to a display 46 the instantaneous product weight on the conveyor 34 and the total product weight having passed over the conveyor 34, the information being updated at selected time intervals.

Figure 5:
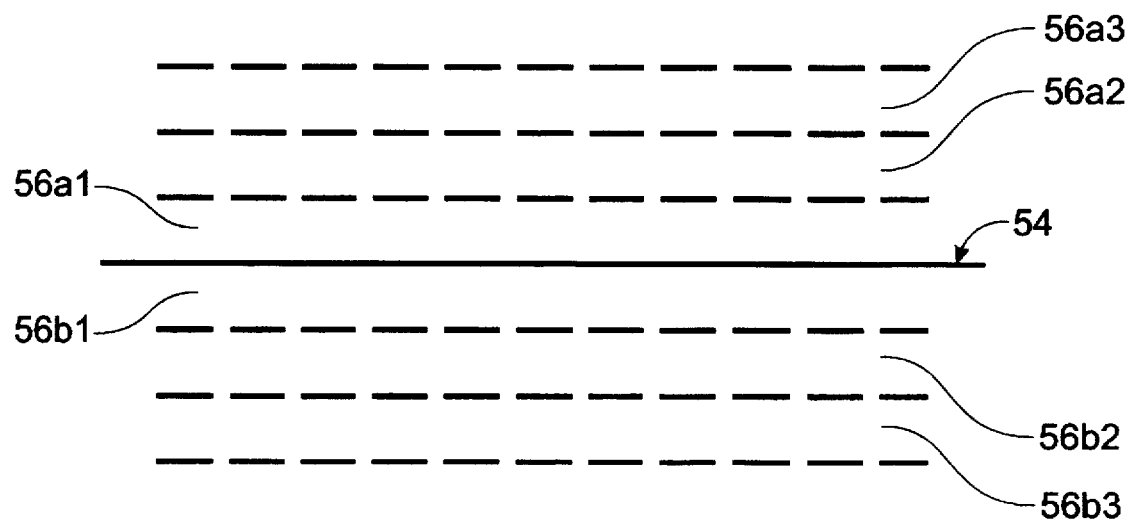
FIG. 5 is a pictorial representation of a control scheme according to the present invention.
Figure 4:
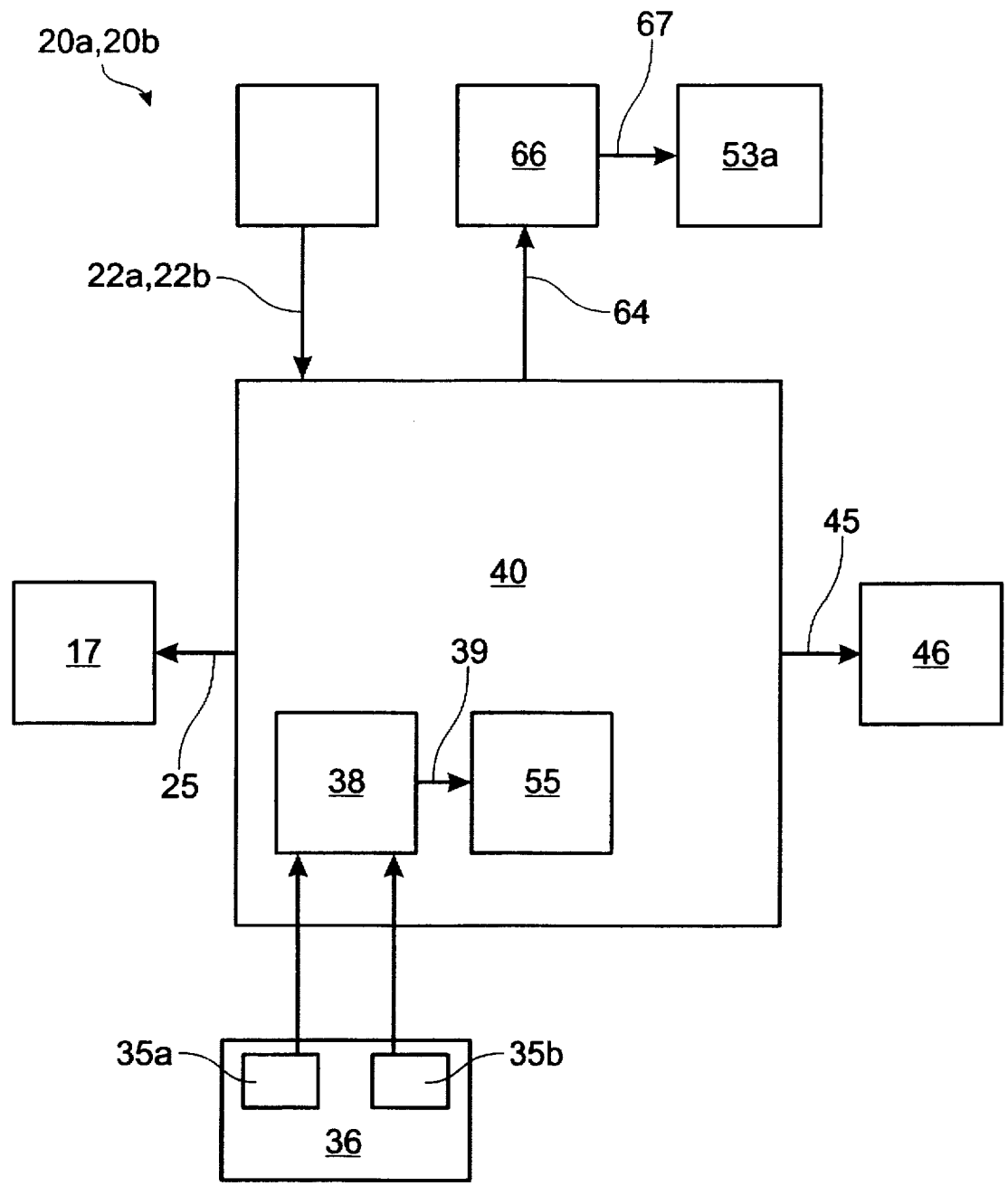
FIG. 4 is a schematic view of a controller according to the present invention.

Referring to FIG. 5, a simple control scheme implemented in the controller 40 has been found sufficient to maintain the desired, set-point flow rate under most circumstances of operation of the apparatus 10. FIG. 5 depicts a target set-point 54 and zones 56a1, 56a2, 56a3; 56b1, 56b2, 56b3 wherein the measured flow rate deviates from the desired set-point 54. Particular values for the set-point 54 and the zones of deviation 56a1–56b3 would need to be determined experimentally, for each product 14, so that the apparatus 10 has an acceptably fast response without becoming unstable.

If the measured flow rate is in zones 56a1 or 56b1, a small magnitude correction is made to the conveyor speeds to bring the measured flow rate to the set-point 54. However, if the flow rate is determined to be in either zones 56a2 or 56b2, a larger magnitude correction is made to bring the measured rate into zones 56a1 or 56b1, respectively. Similarly, if the flow rate is determined to be in either zones 56a3 or 56b3, an even larger magnitude correction is made to bring the measured rate into zones 56a2 or 56b2, respectively. While the zones are shown as being substantially the same size in FIG. 5, the zones can be of different relative sizes without departing from the principles of the invention.

Figure 2:
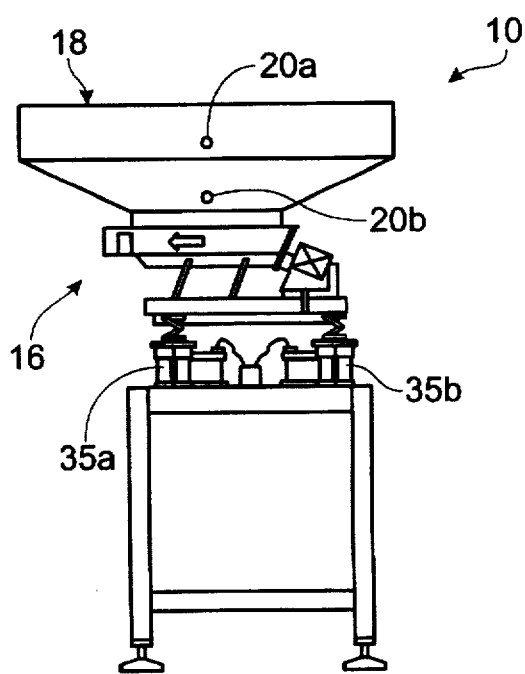
FIG. 2 is a side elevation of a second embodiment of a weighing vibratory apparatus according to the present invention.

Referring to FIG. 2, a second embodiment of an apparatus for monitoring and controlling the flow rate of a stream of bulk product according to the present invention 10 is shown. Instead of using an infeed vibratory conveyor 12 to feed the weighing vibratory conveyor 16, an infeed hopper 18 is directly installed on the weighing vibratory conveyor. In this embodiment, the load cells 35a, 35b weigh the contents of the hopper 18 in addition to the product 14 that is on the conveyor 34. Thence, the system is arranged to adjust flow rate by the loss in weight of the system as product is conveyed off the apparatus 10.

The product 14 is fed to the hopper 18 by the aforementioned infeed means until the high level sensor 20a indicates the hopper is full. The high level sense signal 22a becomes "true." The controller 40 outputs the infeed control signal 25, in response to the signal 22a, to signal the shutting off, or to shut off, the infeed control means. The conveyor 34 carries off some of the product 14 and a rate of weight loss is computed by the controller 40 in response to the change in the weight sum signal 39 over an interval of time, preferably measured by a clock internal to the controller. The controller then varies the speed of the conveyor until the rate of weight loss is equal to the desired, set-point flow rate.

After some time during which product is being conveyed out of the apparatus 10, the low level sensor 20b will sense a low level of the product 14 at the sensor 20b. The low level sense signal 22b becomes "true." The controller 40 ceases to adjustably control the speed of the conveyor, leaving the speed substantially equal to what it was when the low level was reached. The controller outputs the infeed control means signal 25, in response to the signal 22b, to signal the switching on, or to switch on, the infeed control means, to fill the hopper 18. The conveyor continues to run at the aforementioned speed until the high level sensor indicates that the product is filled to the high level after. Thereafter, the aforementioned cycle is repeated.

It is to be recognized that, while specific embodiments of a weighing vibratory apparatus and method have been shown as preferred, other configurations could be utilized, in addition to configurations already mentioned, without departing from the principles of the invention. For example, while two forms of mechanical damping in combination with electrical damping has been described as being preferred, less damping may be sufficient depending on system parameters. Any one of the aforementioned damping mechanisms may be employed alone or in combination with any other of the mechanisms without departing from the principles of the invention. In general, selecting the type and amount of damping required for a given product and desired flow or dispensation rate will depend on a comprehensive consideration of the apparatus, loaded with product, as a whole, and will be found by trial and error.

The terms and expressions which have been employed in the foregoing specification are used therein as terms of description and not of limitation, and there is no intention of the use of such terms and expressions of excluding equivalents of the features shown and described or portions thereof, it being recognized that the scope of the invention is defined and limited only by the claims which follow.

I claim:

1. A vibratory apparatus for weighing one or more objects supported thereby, comprising:

a vibratory element for supporting the objects to be weighed;

a first oscillatory drive mechanism operably connected to said vibratory element, said oscillatory drive mechanism being adapted to cause periodic movements of said vibratory element; and a weighing mechanism, operably connected to said vibratory element for determining the weight of the objects on said vibratory element, said weighing mechanism being adapted to weigh the objects while said periodic movements are occurring.

2. The apparatus of claim 1, further comprising a damping mechanism connected between said weighing mechanism and said vibratory element, said damping mechanism being adapted to attenuate transmission of said periodic movements of said vibratory element to said weighing mechanism.

3. The apparatus of claim 2, wherein said damping mechanism comprises one or more compliant elements coupling said vibratory element to said weighing mechanism.

4. The apparatus of claim 2, wherein said damping mechanism comprises a damping fluid coupled to said weighing mechanism.

5. The apparatus of claim 1, wherein said weighing mechanism provides a signal corresponding to the weight of the objects, the apparatus further comprising an electrical circuit to which said signal is provided, said electrical circuit filtering said signal so as to attenuate higher frequency components thereof.

6. The apparatus of claim 1, wherein said vibratory element comprises a first conveyor element for conveying the objects from one location to another.

7. The apparatus of claim 6, further comprising:

a second conveyor element;

a second oscillatory drive mechanism operably connected to said second conveyor element, said second oscillatory drive mechanism being adapted to cause periodic movements of said second conveyor element so as to cause the objects, as they are placed at an entry location on said second conveyor element, to move toward an exit location for placement on said first conveyor element; and a control mechanism connected between said weighing mechanism and said second oscillatory drive element for controlling said periodic movements of said second conveyor element in response to the weight of the objects determined by said weighing mechanism.

8. A method for weighing one or more objects in a vibratory apparatus having a vibratory element for supporting the objects to be weighed and a first oscillatory drive mechanism for causing periodic movements of the vibratory element, comprising the steps of:

connecting a weighing mechanism to the vibratory element;

weighing the objects on the vibratory element by said weighing mechanism while the periodic movements are occurring to determine a weight of the objects on the vibratory element; and filtering out of said weighing mechanism higher frequency motion components so as to attenuate the effect of the periodic movements of the vibratory element on said weighing of the objects.

9. The method of claim 8, wherein said filtering comprises damping said weighing mechanism so as to attenuate transmission of the periodic movements of the vibratory element to said weighing mechanism.

10. The method of claim 9, wherein said damping includes coupling one or more compliant elements between said weighing mechanism and the vibratory element.

11. The method of claim 9, wherein said damping includes coupling a damping fluid between said weighing mechanism and the vibratory element.

12. The method of claim 8, wherein said step of weighing comprises providing a signal corresponding to the measured weight of the object as a function of time and said step of filtering includes electrically filtering said signal so as to attenuate higher frequency components thereof.

13. The method of claim 8, wherein the vibratory element includes a first conveyor element, the method further comprising conveying the objects from one location to another by the first conveyor.

14. The method of claim 8, further comprising placing the objects on the vibratory element and operating the vibratory element so as to cause the objects to move toward and be dispensed from an exit location, wherein said weighing determines a loss of weight indicative of the flow rate of the objects.

15. The method of claim 13, wherein the vibratory apparatus includes a second conveyor and a second oscillatory drive mechanism for causing periodic movements of the second conveyor so as to cause the objects, as they are placed at an entry location on the second conveyor element, to move toward an exit location for placement on the first conveyor element, the method further comprising controlling the periodic movements of the second conveyor element in response to said weight.

16. The method of claim 13, further comprising controlling the periodic movements of the first conveyor element in response to said weight.

17. The method of claim 15, further comprising controlling the periodic movements of the first conveyor element in response to said loss of weight.

* * * * *